(12) United States Patent
Luo et al.

(10) Patent No.: US 11,695,480 B2
(45) Date of Patent: Jul. 4, 2023

(54) HIGH-SPEED OPTICAL TRANSCEIVER INTEGRATED CHIP DRIVE CIRCUIT WITH PHASE DELAY COMPENSATION FUNCTION

(71) Applicant: XIAMEN EOCHIP SEMICONDUCTOR CO., LTD, Xiamen (CN)

(72) Inventors: Zhicong Luo, Xiamen (CN); Jinghu Li, Xiamen (CN); Zhang Fan, Xiamen (CN); Fujie Chen, Xiamen (CN); Qipeng Lin, Xiamen (CN); An Lin, Xiamen (CN); Jianhai Yu, Xiamen (CN); Hanghui Tu, Xiamen (CN)

( * ) Notice: Subject to any disclaimer, the term of this patent is extended or adjusted under 35 U.S.C. 154(b) by 50 days.

(21) Appl. No.: 17/621,209

(22) PCT Filed: Jan. 22, 2021

(86) PCT No.: PCT/CN2021/073228
§ 371 (c)(1),
(2) Date: Dec. 20, 2021

(87) PCT Pub. No.: WO2022/126829
PCT Pub. Date: Jun. 23, 2022

(65) Prior Publication Data
US 2022/0399941 A1    Dec. 15, 2022

(30) Foreign Application Priority Data

Dec. 18, 2020   (CN) .......................... 202011510825.X

(51) Int. Cl.
*H04B 10/40*   (2013.01)
*H04B 1/12*    (2006.01)
(Continued)

(52) U.S. Cl.
CPC ............... *H04B 10/40* (2013.01); *H04B 1/12* (2013.01); *H04B 10/503* (2013.01); *H04B 10/548* (2013.01); *H04L 25/03343* (2013.01)

(58) Field of Classification Search
CPC .... H04B 10/40; H04B 10/503; H04B 10/548; H04B 10/43; H04B 10/501; H04B 10/616;
(Continued)

(56) References Cited

U.S. PATENT DOCUMENTS 5,926,542 A  *  7/1999  Huang .................. H04M 1/573
                                                                    379/215.01
10,361,786 B1    7/2019  Ardalan
(Continued)

FOREIGN PATENT DOCUMENTS

CN           207560004 U    6/2018
CN           110417480 A    11/2019

*Primary Examiner* — Hibret A Woldekidan
(74) *Attorney, Agent, or Firm* — Novoclaims Patent Services LLC; Mei Lin Wong

(57) ABSTRACT

A high-speed optical transceiver integrated chip drive circuit with phase delay compensation function includes a transmitting end drive circuit to drive the laser to emit light to transmit signals and a receiving end drive circuit to optimize the signal degradation caused by the signal sent by the transmitting end drive circuit to the laser via the transmission backplane; a long code phase lead adjustment circuit is arranged on the main channel of the transmitting end drive circuit, and a long code phase lag adjustment circuit is set on the main channel of the receiving end drive circuit. The present invention is used to optimize high-speed signals and solve the problem that the CML drive circuit at the receiving end or the laser drive circuit at the transmitting end cannot compensate the difference between the group delay and phase delay for the high-speed signal after passing through the backplane (Laser device).

12 Claims, 12 Drawing Sheets

(51) Int. Cl.
*H04B 10/50* (2013.01)
*H04B 10/548* (2013.01)
*H04L 25/03* (2006.01)

(58) Field of Classification Search
CPC .... H04B 10/2589; H04B 10/516; H04B 1/12; H04L 25/03343; B66F 9/07; B66F 9/24
USPC .................................................. 398/135–138
See application file for complete search history.

(56) References Cited

U.S. PATENT DOCUMENTS

2005/0069327 A1* 3/2005 Franck ............... H04B 10/2589
398/141
2010/0329669 A1* 12/2010 Cunningham ......... H04B 10/40
398/44
2018/0284370 A1* 10/2018 Ho ....................... G02B 6/4245

* cited by examiner

HIGH-SPEED OPTICAL TRANSCEIVER INTEGRATED CHIP DRIVE CIRCUIT WITH PHASE DELAY COMPENSATION FUNCTION

BACKGROUND OF THE PRESENT INVENTION

Field of Invention

The present invention relates to a topological structure of a CML drive circuit for optical receiving channel and laser drive circuit for optical transmission channel, which belongs to the field of optical communication integrated circuit. CML is the abbreviation of Current Mode Logic, the Current Mode Logic.

Description of Related Arts

The integrated optical transceiver chip mainly includes an optical receiving module and an optical transmitting module to realize the reception and transmission of high-speed data transmission. At the receiving end of the integrated transceiver chip, the CML driver drives the backplane transmission line circuit to transmit high-speed data to the processor for processing. At the transmitting end, the laser drive circuit drives the laser device to send optical signals with high-speed data, completing the process of converting electrical signals into optical signals and the transmission of signals. From the perspective of frequency domain, the high-speed transmission line backplane can be simplified to a low-pass filter model. If the data rate is greater than the cut-off frequency of the low-pass filter, the transmission signal will be damaged to a certain extent, which will eventually lead to the deterioration of the eye diagram and the increase of the bit error rate. The frequency response of the laser is related to the bias current, which can be simplified as a band-pass filter model, which suppresses the low-frequency and high-frequency components of high-speed data, resulting in the deterioration of the optical signal eye diagram. In order to solve this problem, the commonly used method in the conventional art is to introduce pre-emphasis, de-emphasis and equalization technologies. The de-emphasis technology maintains the amplitude of the rising and falling edges of the signal, and the amplitude of other places is weakened. The pre-emphasis technology enhances the amplitude of the rising and falling edges of the signal, and the amplitude remains unchanged in other places.

Most of the emphasize methods used is illustrated in the comparison drawing as shown in FIG. 1, where X provides a data signal degradation after passing through a transmission backplane. When high-speed data passes through a passive link, due to signal loss (insertion loss), impedance discontinuity (reflection), crosstalk of other signals, etc., the signal integrity is damaged and the signal-to-noise ratio (SNR) is reduced, resulting in bit error (BER) in the high-speed data transmission, so the high-frequency component of the high-speed data must be compensated at the transmitting end in advance. Y is the situation after the output signal is optimized by the traditional de-emphasis method. The traditional de-emphasis method does not distinguish between long code and short code high-speed signals. It only compensates for the frequency attenuation of the high-speed signal after passing through the backplane or the laser device, and cannot compensate for the difference in group delay and phase delay between long code and short code high-speed signals after passing through the backplane or laser.

SUMMARY OF THE PRESENT INVENTION

An object of the present invention is to provide a high-speed optical transceiver integrated chip drive circuit with phase delay compensation function to solve the problem that a CML drive circuit at the receiving end or a laser drive circuit at the transmitting end fail to compensate for the difference between group delay and phase delay after a high-speed signal passes through the backplane (laser device) by using the traditional de-emphasis method.

The present invention provides a high-speed optical transceiver integrated chip drive circuit with phase delay compensation function, which comprises a transmitting end drive circuit and a receiving end drive circuit, the transmitting end drive circuit is used to drive a laser device to emit light for transmitting signals and the receiving end drive circuit is used to optimize a signal degradation caused by the signal transmission by the transmitter end drive circuit to the laser device through a transmission backplane;

a long code phase lead adjustment circuit provided on a main channel of the transmitter end drive circuit; a long code phase lag adjustment circuit provided on a main channel of the receiving end drive circuit;

the long code phase lead adjustment circuit comprises an operational amplifier A0, an operational amplifier A1 and an operational amplifier A2, a non-inverting input terminal Vinp and an inverting input terminal Vinn of the operational amplifier A0 are used to receive external input electrical signals;

an inverting output terminal Von0 of the operational amplifier A0 is connected to a non-inverting input terminal Vinp1 of the operational amplifier A1;

a non-inverting output terminal Vop0 of the operational amplifier A0 is connected to an inverting input terminal Vinn1 of the operational amplifier A1;

an inverting output terminal Von1 of the operational amplifier A1 is simultaneously connected to an output port of the drive circuit Von and an inverting input terminal Vinn2 of the operational amplifier A2;

a non-inverting output terminal Vop1 of the operational amplifier A1 is simultaneously connected to an output port of the drive circuit Vop and a non-inverting input terminal Vinp2 of the operational amplifier A2;

an inverting output terminal Von2 of the operational amplifier A2 is connected to a non-inverting input terminal VFinp of the operational amplifier A0, and a non-inverting output terminal Vop2 of the operational amplifier A2 is connected to an inverting input terminal VFinn of the operational amplifier A0;

the long code phase lag adjustment circuit comprises an operational amplifier A0, an operational amplifier A1 and an operational amplifier A2, a non-inverting input terminal Vinp and an inverting input terminal Vinn of the operational amplifier A0 are used to receive external input electrical signals;

an inverting output terminal Von0 of the operational amplifier A0 is connected to a non-inverting input terminal Vinp1 of the operational amplifier A1;

a non-inverting output terminal Vop0 of the operational amplifier A0 is connected to an inverting input terminal Vinn1 of the operational amplifier A1;

an inverting output terminal Von1 of the operational amplifier A1 is simultaneously connected to an output port of the drive circuit Von and an inverting input terminal Vinn2 of the operational amplifier A2;

a non-inverting output terminal Vop1 of the operational amplifier A1 is simultaneously connected to an output port of the drive circuit Vop and a non-inverting input terminal Vinp2 of the operational amplifier A2;

wherein an inverting output terminal Von2 of the operational amplifier A2 is connected to an inverting input terminal VFinn of the operational amplifier A0 while a non-inverting output terminal Vop2 of the operational amplifier A2 is connected to a non-inverting input terminal VFinp of the operational amplifier A0; or an inverting output terminal Von2 of the operational amplifier A2 is connected to a non-inverting input terminal VFinp of the operational amplifier A0, and a non-inverting output terminal Vop2 of the operational amplifier A2 is connected to an inverting input terminal VFinn of the operational amplifier A0.

Preferably, the operational amplifier A0 comprises a bipolar transistor Q1, a bipolar transistor Q2, a bipolar transistor Q3, a bipolar transistor Q4, a resistor R1, a resistor R2, an inductor L1, an inductor L2, a current source $I_B$, and a current source $I_{B1}$;

a base terminal of the bipolar transistor Q1 is connected to the non-inverting input terminal Vinp;

a base terminal of the bipolar transistor Q2 is connected to the inverting input terminal Vinp;

an anode of the current source $I_B$ is simultaneously connected to an emitter terminal of the bipolar transistor Q1 and an emitter terminal of the bipolar transistor Q2;

a cathode of the current source $I_B$ is connected to ground;

a collector terminal of the bipolar transistor Q1 is simultaneously connected to one end of the resistor R1, a collector terminal of the bipolar transistor Q3 and the output port Von0;

a collector terminal of the bipolar transistor Q2 is simultaneously connected to one end of the resistor R2, a collector terminal of the bipolar transistor Q4 and the output port Vop0;

a base terminal of the bipolar transistor Q3 is connected to the non-inverting input terminal Vfinp;

a base terminal of the bipolar transistor Q4 is connected to the inverting input terminal Vfinn;

an anode of the current source $I_{B1}$ is simultaneously connected to an emitter terminal of the bipolar transistor Q3 and an emitter terminal of the bipolar transistor Q4;

a cathode of the current source $I_{B1}$ is connected to ground;

another end of the resistor R1 is connected to one end of the inductor L1;

another end of the resistor R2 is connected to one end of the inductor L2;

another ends of the inductors L1 and L2 are simultaneously connected to the power supply VCC.

Preferably, both the current source $I_B$ and the current source $I_{B1}$ are adjustable tail current sources, the current source $I_B$ comprises n+1 current branches composed of current sources $I_0, I_1, I_2, \ldots, I_n$, wherein the current branches $I_1, I_2, \ldots, I_n$, are on/off controlled by switches $K_1, K_2, \ldots, K_n$ respectively; the current source IB1 comprises n current branches composed of current sources $I_1, I_2, \ldots, I_n$, wherein the current branches $I_1, I_2, \ldots, I_n$, are on/off controlled by switches $\overline{K_1}, \overline{K_2}, \ldots, \overline{K_n}$ respectively; an on/off state of the current source IB and an on/off state of the current source $I_{B1}$ are complementary and opposite;

an output amplitude of a high-speed signal after being modulated by the operational amplifier A0 of the long code phase lag adjustment circuit is:

$$A = \begin{cases} 2I_0R_1 - 2(\overline{K_1}I_1 + \overline{K_2}I_2 + \ldots + \overline{K_n}I_n)R_1 & 0 \le t \le \tau \\ 2I_0R_1 + 2(I_1 + I_2 + \ldots + I_n)R_1 & \tau \le t \le mT \end{cases}$$

an output amplitude of a short code signal after being modulated by the operational amplifier A0 of the long code phase lag adjustment circuit is:

$$A = 2I_0R_1 - 2(\overline{K_1}I_1 + \overline{K_2}I_2 + \ldots + \overline{K_n}I_n)R_1$$

where T is 1 minimum symbol width, a long code signal width is mT, m>1; a short code signal width is T;

τ is a delay time of a signal in a feedback loop, that is, a time difference between the signal reaching the non-inverting input terminal Vinp and VFinp of the operational amplifier A0;

an output amplitude of a high-speed signal after being modulated by the operational amplifier A0 of the long code phase lead adjustment circuit is:

$$A = \begin{cases} 2I_0R_1 + 2(\overline{K_1}I_1 + \overline{K_2}I_2 + \ldots + \overline{K_n}I_n)R_1 & 0 \le t \le \tau \\ 2I_0R_1 - 2(I_1 + I_2 + \ldots + I_n)R_1 & \tau \le t \le mT \end{cases}$$

an output amplitude of a short code signal after being modulated by the operational amplifier A0 of the long code phase lead adjustment circuit is:

$$A = 2I_0R_1 + 2(\overline{K_1}I_1 + \overline{K_2}I_2 + \ldots + \overline{K_n}I_n)R_1.$$

Preferably, the operational amplifier A1 comprises a bipolar transistor Q5, a bipolar transistor Q6, a resistor R5, a resistor R6, an inductor L5, an inductor L6, a current source $I_1$ and a Delay Cell (Delay Cell);

the input terminals Vinp1 and Vinn1 are connected to input terminals of the Delay Cell;

a base terminal of the bipolar transistor Q5 and a base terminal of the bipolar transistor Q6 are connected to output terminals of the Delay Cell;

an anode of the current source $I_1$ is simultaneously connected to an emitter terminal of the bipolar transistor Q5 and an emitter terminal of the bipolar transistor Q6;

a cathode of the current source $I_1$ is connected to ground;

a collector terminal of the bipolar transistor Q5 is simultaneously connected to one end of the resistor R5 and the inverting output terminal Von1;

a collector terminal of the bipolar transistor Q6 is simultaneously connected to one end of the resistor R6 and the non-inverting output terminal Vop1;

another end of the resistor R5 is connected to one end of the inductor L5;

another end of the resistor R6 is connected to one end of the inductor L6;

another ends of the inductors L5 and L6 are simultaneously connected to the power supply VCC.

Preferably, the operational amplifier A2 comprises a bipolar transistor Q7, a bipolar transistor Q8, a resistor R7, a resistor R8, an inductor L7, an inductor L8, a current source $I_2$;

a base terminal of the bipolar transistor Q7 is connected to the non-inverting input terminal Vinp2;

a base terminal of the bipolar transistor Q8 is connected to the inverting input terminal Vinn2;

an anode of the current source $I_2$ is simultaneously connected to an emitter terminal of the bipolar transistor Q7 and an emitter terminal of the bipolar transistor Q8;

a cathode of the current source $I_2$ is connected to ground;

a collector terminal of the bipolar transistor Q7 is simultaneously connected to one end of the resistor R7 and the inverting output terminal Von2;

a collector terminal of the bipolar transistor Q8 is simultaneously connected to one end of the resistor R8 and the non-inverting output terminal Vop2;

another end of the resistor R7 is connected to one end of the inductor L7;

another end of the resistor R8 is connected to one end of the inductor L8;

another ends of the inductors L7 and L8 are simultaneously connected to the power supply VCC.

Preferably, the receiving end drive circuit further comprises a de-emphasis channel 1, the main channel further comprises a current mode logic CLM2, the current mode logic CLM2 is connected in series between the long code phase lead adjustment circuit on the main channel and the output port of the drive circuit; the de-emphasis channel 1 is connected in parallel to two ends of the main channel, or two ends of the phase lag adjustment circuit at the operational amplifier A1 and the current mode logic CLM2.

Preferably, the transmitting end drive circuit further comprises de-emphasis channel 3 and de-emphasis channel 2, the main channel further comprises a current mode logic CLM2, the current mode logic CLM2 is connected in series between the long code phase lead adjustment circuit on the main channel and the output port of the drive circuit; the de-emphasis channel 3 is connected in parallel to two ends two ends of the phase lag adjustment circuit at the operational amplifier A1 and the current mode logic CLM2, the de-emphasis channel 2 is connected in parallel at two ends of the current mode logic CLM2.

Preferably, the de-emphasis channel 1 is composed of the Delay Cell, the operational amplifier A3 and the current mode logic CLM1 connected in series;

the de-emphasis channel 3 is composed of sequentially connected the operational amplifier A3 and the current mode logic CLM1 in series;

the de-emphasis channel 2 is composed of the operational amplifier A4 and the current mode logic CLM3 connected in series;

a structure of the operational amplifier A3, A4 is identical to a structure of the operational amplifier A2, a structure of the current mode logic CLM1 and CLM3 is identical to a structure of the current mode logic CLM2.

Preferably, the current mode logic CLM2 comprises a bipolar transistor Q13, a bipolar transistor Q14 and a current source $I_{CML}$;

a base terminal of the bipolar transistor Q13 is connected to the non-inverting input terminal Vinp5;

a base terminal of the bipolar transistor Q14 is connected to the inverting input terminal Vinn5;

an anode of the current source ICML is simultaneously connected to an emitter terminal of the bipolar transistor Q13 and an emitter terminal of the bipolar transistor Q14;

a cathode of the current source ICML is connected to ground;

a collector terminal of the bipolar transistor Q13 is connected to the output port Von of the drive circuit;

a collector terminal of the bipolar transistor Q14 is connected to the output port Vop of the drive circuit.

Preferably, the receiving end drive circuit or the transmitting end drive circuit further comprises a resonance module, and the resonance module is provided at an output port of the main channel, the resonance module comprises a resistor R3, a resistor R4, an inductor L3, and an inductor L4, one end of the inductor L3 and one end of the inductor L4 are simultaneously connected to the power supply VCC;

another end of the inductor L3 is connected to one end of the resistor R3; another end of the resistor R3 is connected to the output terminal Von of the drive circuit;

another end of the inductor L4 is connected to one end of the resistor R4; another end of the resistor R4 is connected to the output terminal Vop of the drive circuit.

The beneficial effects of the present invention: The traditional de-emphasis method does not distinguish between long-code and short-code high-speed signals. It only compensates for the frequency attenuation of high-speed signals after passing through the backplane or laser, and cannot compensate for the group delay and phase delay difference between the long code and short code high-speed signals after passing through the backplane or laser.

According to the present invention, a phase delay adjustment circuit is added to the conventional framework of the transmitting end drive circuit and the receiving end drive circuit. Specifically, a long code phase lead adjustment circuit is set on the main channel of the transmitting end drive circuit, and a long code phase lag adjustment circuit is set on the main channel of the receiving end drive circuit. By adjusting the phases of high-speed data with different code lengths separately, the high-frequency signal attenuation of the high-speed backplane and laser is effectively compensated, and the difference between the group delay and phase delay after the long code and short code high-speed signals pass through the backplane or laser are compensated, thus the integrity of the signal is ensured. In this way, an ideal high-speed signal can be obtained at the receiving end. By using the drive circuit of the present invention, the optical eye diagram of the laser output has become better and has passed the verification of the simulation results.

DETAILED DESCRIPTION OF THE PREFERRED EMBODIMENT

Preferred Embodiment 1: This embodiment is described with reference to FIGS. 2-8 and FIGS. 12-21 as follows: According to this embodiment, a high-speed optical transceiver integrated chip drive circuit with phase delay compensation function comprises a transmitting/sending end drive circuit and a receiving end drive circuit, the transmitting end drive circuit is used to drive a laser device to emit light for transmitting signals and the receiving end drive circuit is used to optimize a signal degradation caused by the signal transmission by the transmitter end drive circuit to the laser device through a transmission backplane; characterized in that: integrated chip drive circuit comprises a long code phase lead adjustment circuit provided on a main channel of the transmitter end drive circuit; and a long code phase lag adjustment circuit provided on a main channel of the receiving end drive circuit.

Figure 3:
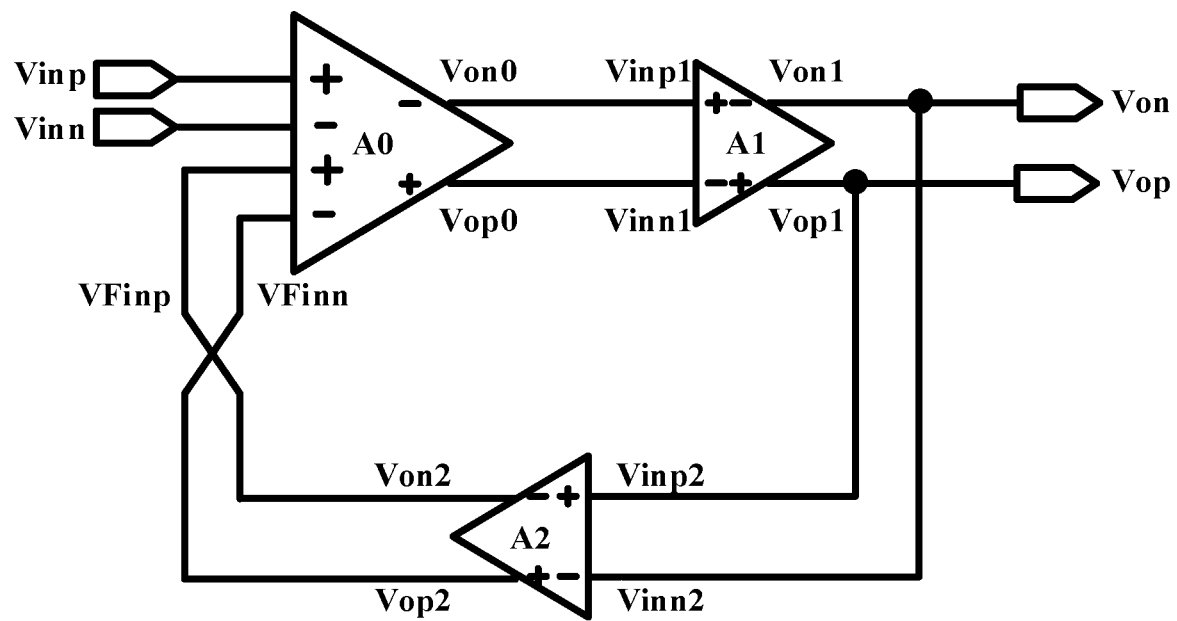
FIG. 3 is a schematic diagram of the long code phase lead adjustment circuit.

Referring to FIG. 3 of the drawings, the long code phase lead adjustment circuit comprises an operational amplifier A0, an operational amplifier A1 and an operational amplifier A2;

a non-inverting input terminal Vinp and an inverting input terminal Vinn of the operational amplifier A0 are used to receive external input electrical signals;

an inverting output terminal Von0 of the operational amplifier A0 is connected to a non-inverting input terminal Vinp1 of the operational amplifier A1;

a non-inverting output terminal Vop0 of the operational amplifier A0 is connected to an inverting input terminal Vinn1 of the operational amplifier A1;

an inverting output terminal Von1 of the operational amplifier A1 is simultaneously connected to an output port of the drive circuit Von and an inverting input terminal Vinn2 of the operational amplifier A2;

a non-inverting output terminal Vop1 of the operational amplifier A1 is simultaneously connected to an output port of the drive circuit Vop and a non-inverting input terminal Vinp2 of the operational amplifier A2;

an inverting output terminal Von2 of the operational amplifier A2 is connected to a non-inverting input terminal VFinp of the operational amplifier A0, and a non-inverting output terminal Vop2 of the operational amplifier A2 is connected to an inverting input terminal VFinn of the operational amplifier A0.

Figure 1:
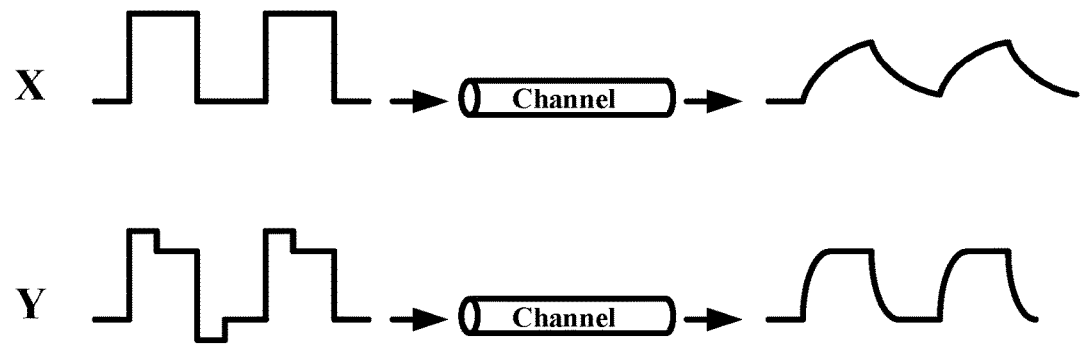
FIG. 1 is a comparison diagram of optimized and unoptimized transmission signals using de-emphasis method, where X is a schematic diagram of data signal degradation after passing through a transmission backplane, and Y is a schematic diagram of optimizing output signals using traditional de-emphasis method.
Figure 2:
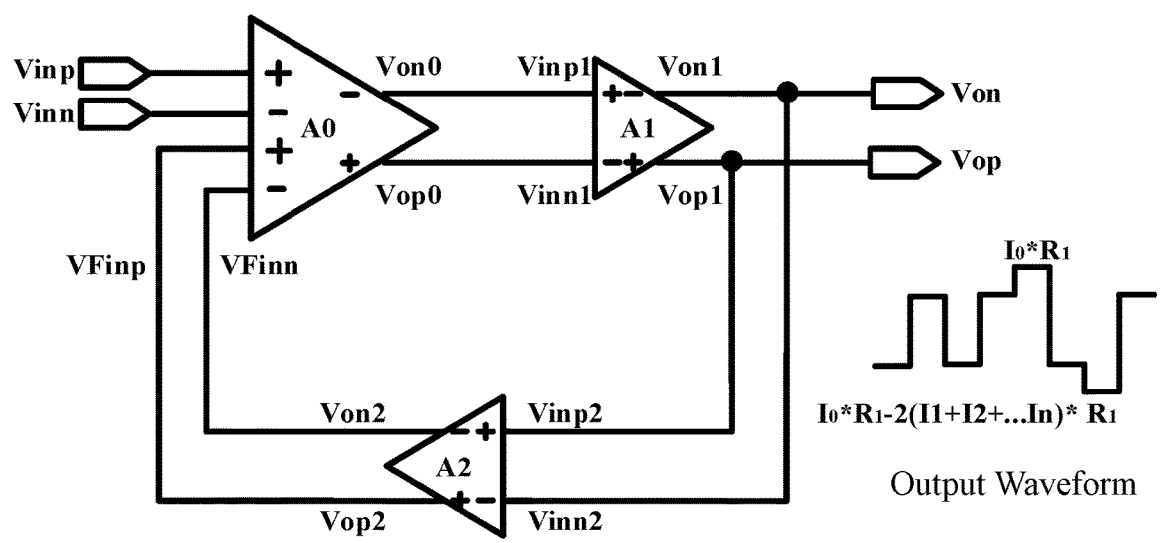
FIG. 2 is a schematic diagram of the long code phase lag adjustment circuit.
Figure 6:
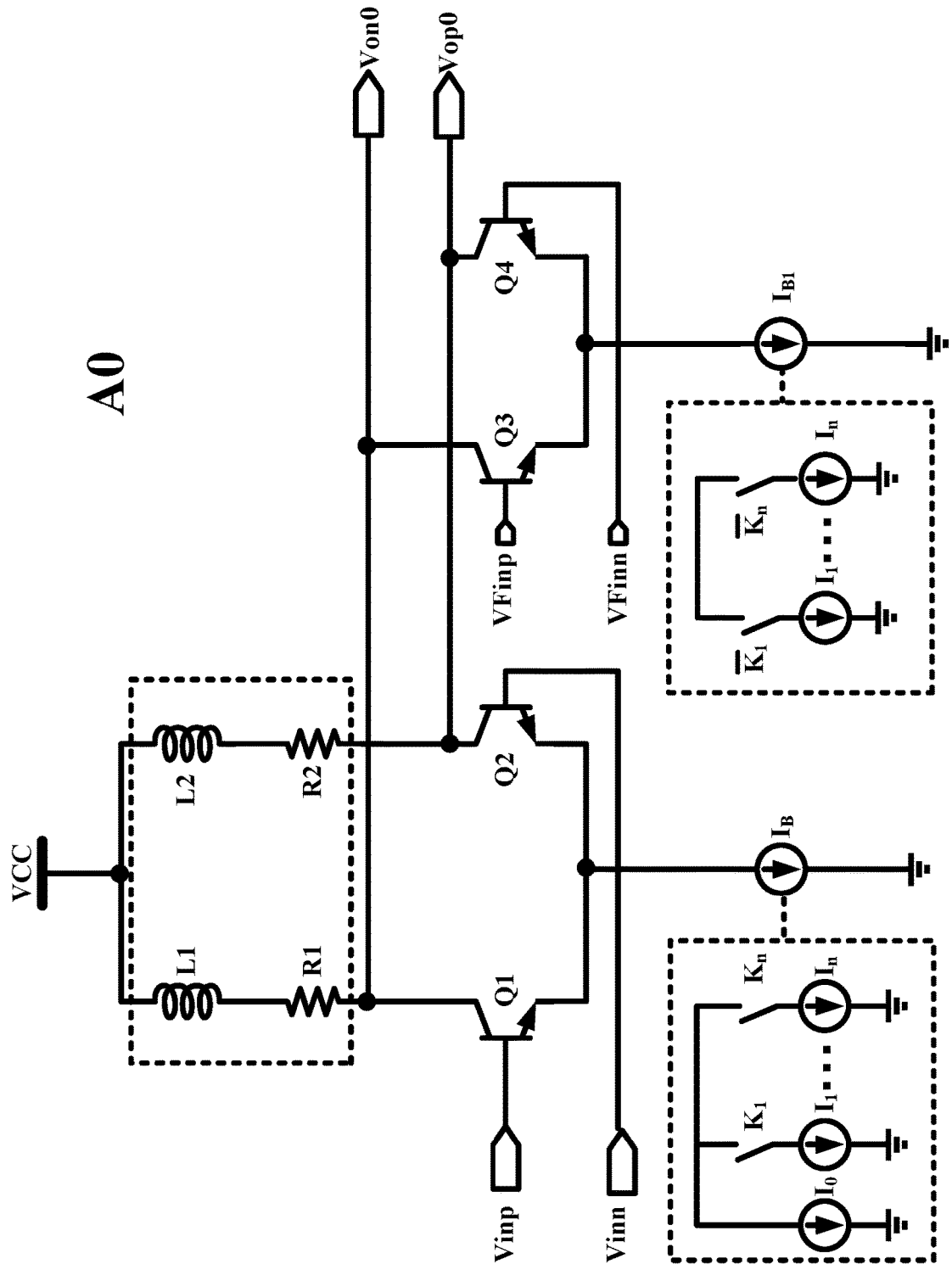
FIG. 6 is a schematic circuit diagram of the amplifier A0.
Figure 7:
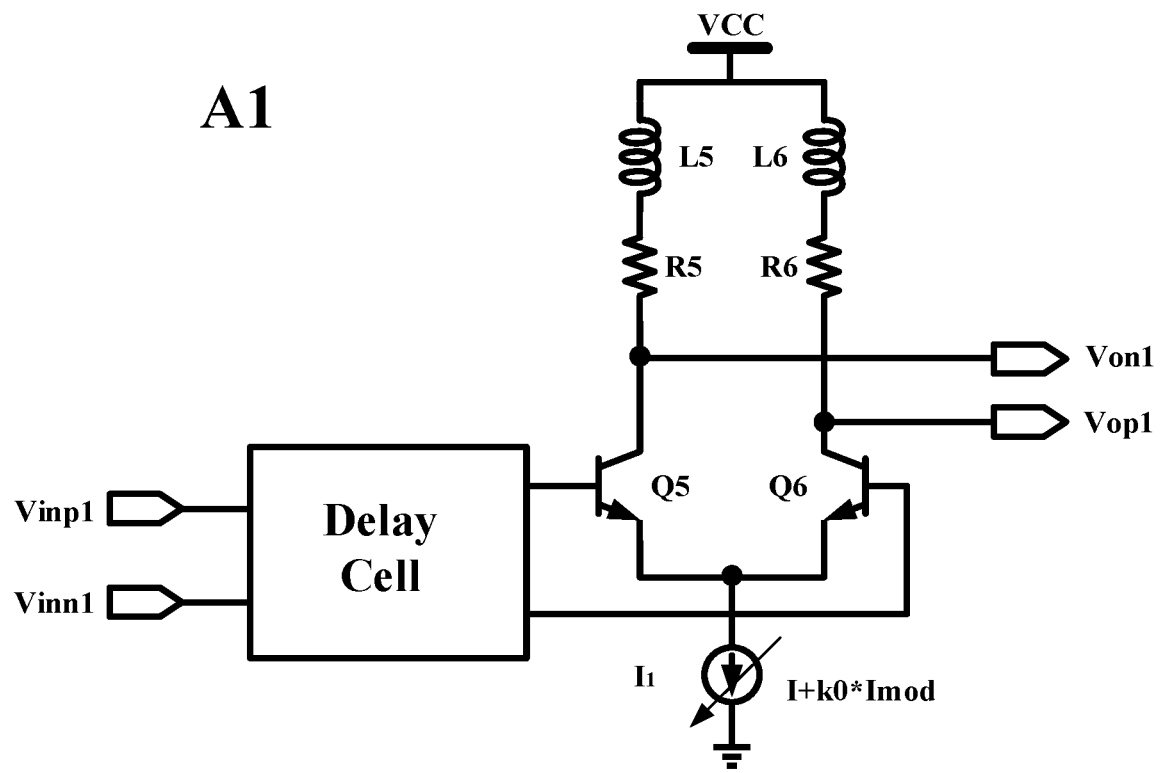
FIG. 7 is a schematic circuit diagram of the amplifier A1.
Figure 8:
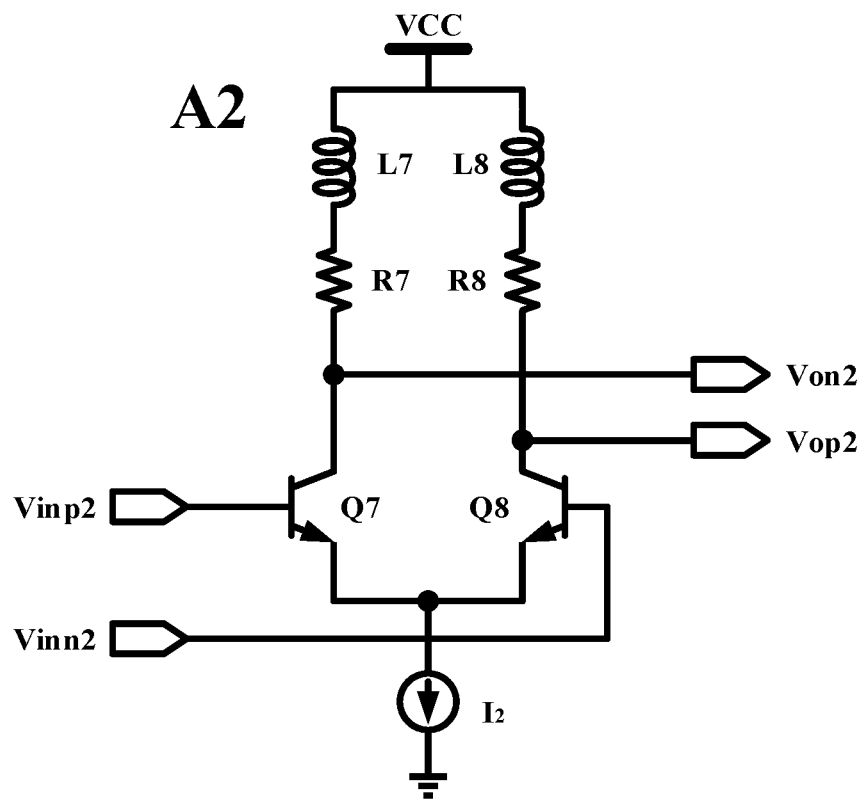
FIG. 8 is a schematic circuit diagram of the amplifier A2.

Referring to FIG. 2 of the drawings, the long code phase lag adjustment circuit comprises an operational amplifier A0, an operational amplifier A1 and an operational amplifier A2, a non-inverting input terminal Vinp and an inverting input terminal Vinn of the operational amplifier A0 are used to receive external input electrical signals;

an inverting output terminal Von0 of the operational amplifier A0 is connected to a non-inverting input terminal Vinp1 of the operational amplifier A1;

a non-inverting output terminal Vop0 of the operational amplifier A0 is connected to an inverting input terminal Vinn1 of the operational amplifier A1;

an inverting output terminal Von1 of the operational amplifier A1 is simultaneously connected to an output port of the drive circuit Von and an inverting input terminal Vinn2 of the operational amplifier A2;

a non-inverting output terminal Vop1 of the operational amplifier A1 is simultaneously connected to an output port of the drive circuit Vop and a non-inverting input terminal Vinp2 of the operational amplifier A2;

an inverting output terminal Von2 of the operational amplifier A2 is connected to an inverting input terminal VFinn of the operational amplifier A0 while a non-inverting output terminal Vop2 of the operational amplifier A2 is connected to a non-inverting input terminal VFinp of the operational amplifier A0; or an inverting output terminal Von2 of the operational amplifier A2 is connected to a non-inverting input terminal VFinp of the operational amplifier A0, and a non-inverting output terminal Vop2 of the operational amplifier A2 is connected to an inverting input terminal VFinn of the operational amplifier A0.

Wherein the topological structures of A0, A1, and A2 are shown in FIGS. 6, 7, and 8 of the drawings.

Referring to FIG. 6 of the drawings, the operational amplifier A0 comprises a bipolar transistor Q1, a bipolar transistor Q2, a bipolar transistor Q3, a bipolar transistor Q4, a resistor R1, a resistor R2, an inductor L1, an inductor L2, a current source $I_B$, and a current source $I_{B1}$;

a base terminal of the bipolar transistor Q1 is connected to the non-inverting input terminal Vinp;

a base terminal of the bipolar transistor Q2 is connected to the inverting input terminal Vinp;

an anode of the current source $I_B$ is simultaneously connected to an emitter terminal of the bipolar transistor Q1 and an emitter terminal of the bipolar transistor Q2;

a cathode of the current source $I_B$ is connected to ground;

a collector terminal of the bipolar transistor Q1 is simultaneously connected to one end of the resistor R1, a collector terminal of the bipolar transistor Q3 and the output port Von0;

a collector terminal of the bipolar transistor Q2 is simultaneously connected to one end of the resistor R2, a collector terminal of the bipolar transistor Q4 and the output port Vop0;

a base terminal of the bipolar transistor Q3 is connected to the non-inverting input terminal Vfinp;

a base terminal of the bipolar transistor Q4 is connected to the inverting input terminal Vfinn;

an anode of the current source $I_{B1}$ is simultaneously connected to an emitter terminal of the bipolar transistor Q3 and an emitter terminal of the bipolar transistor Q4;

a cathode of the current source $I_{B1}$ is connected to ground;

another end of the resistor R1 is connected to one end of the inductor L1;

another end of the resistor R2 is connected to one end of the inductor L2;

another ends of the inductors L1 and L2 are simultaneously connected to the power supply VCC.

Both the current source $I_B$ and the current source $I_{B1}$ are adjustable tail current sources, the current source $I_B$ comprises n+1 current branches composed of current sources $I_0$, $I_1, I_2, \ldots, I_n$, wherein the current branches $I_1, I_2, \ldots, I_n$, are on/off controlled by switches $K_1, K_2, \ldots, K_n$ respectively; the current source IB1 comprises n current branches composed of current sources $I_1, I_2, \ldots, I_n$, wherein the current branches $I_1, I_2, \ldots, I_n$, are on/off controlled by switches $\overline{K_1}, \overline{K_2}, \ldots, \overline{K_n}$ respectively; an on/off state of the current source IB and an on/off state of the current source IB1 are complementary and opposite.

Referring to FIG. 7 of the drawings, the operational amplifier A1 comprises a bipolar transistor Q5, a bipolar transistor Q6, a resistor R5, a resistor R6, an inductor L5, an inductor L6, a current source $I_1$ and a Delay Cell;

the input terminals Vinp1 and Vinn1 are connected to input terminals of the Delay Cell;

a base terminal of the bipolar transistor Q5 and a base terminal of the bipolar transistor Q6 are connected to output terminals of the Delay Cell;

an anode of the current source $I_1$ is simultaneously connected to an emitter terminal of the bipolar transistor Q5 and an emitter terminal of the bipolar transistor Q6;

a cathode of the current source $I_1$ is connected to ground;

a collector terminal of the bipolar transistor Q5 is simultaneously connected to one end of the resistor R5 and the inverting output terminal Von1;

a collector terminal of the bipolar transistor Q6 is simultaneously connected to one end of the resistor R6 and the non-inverting output terminal Vop1;

another end of the resistor R5 is connected to one end of the inductor L5;

another end of the resistor R6 is connected to one end of the inductor L6;

another ends of the inductors L5 and L6 are simultaneously connected to the power supply VCC.

Referring to FIG. 8 of the drawings, the operational amplifier A2 comprises a bipolar transistor Q7, a bipolar transistor Q8, a resistor R7, a resistor R8, an inductor L7, an inductor L8, a current source $I_2$;

a base terminal of the bipolar transistor Q7 is connected to the non-inverting input terminal Vinp2;

a base terminal of the bipolar transistor Q8 is connected to the inverting input terminal Vinn2;

an anode of the current source $I_2$ is simultaneously connected to an emitter terminal of the bipolar transistor Q7 and an emitter terminal of the bipolar transistor Q8;

a cathode of the current source $I_2$ is connected to ground;

a collector terminal of the bipolar transistor Q7 is simultaneously connected to one end of the resistor R7 and the inverting output terminal Von2;

a collector terminal of the bipolar transistor Q8 is simultaneously connected to one end of the resistor R8 and the non-inverting output terminal Vop2;

another end of the resistor R7 is connected to one end of the inductor L7;

another end of the resistor R8 is connected to one end of the inductor L8;

another ends of the inductors L7 and L8 are simultaneously connected to the power supply VCC.

The long code phase lag adjustment circuit as shown in FIG. 2 and the long code phase lead adjustment circuit as shown in FIG. 3 realize the CML drive circuit of the optical receiving channel and the laser drive circuit of the optical transmitting channel after cooperating with the CML circuit module.

The working principle of the long code phase lag adjustment circuit is shown in FIG. 2: The long code phase lag adjustment circuit is a feedback loop, which includes operational amplifiers A0, A1 and A2. As shown in FIG. 6, the operational amplifier A0 comprises two adjustable tail current sources $I_B$ and $I_{B1}$, the size of the current source $I_B$ can be expressed as: $I_0+K_1I_1+K_2I_2+\ldots+K_nI_n$, and the size of the current source $I_{B1}$ can be expressed as: $\overline{K_1}I_1+\overline{K_2}I_2+\ldots+\overline{K_n}I_n$. The current sources $I_B$ and $I_{B1}$ include current branches $I_1, I_2, \ldots$. The switches $K_n$ and $\overline{K_n}$ are in complementary and opposite state. For example, when $I_1, I_2, \ldots I_n$ in $I_B$ are turned on, then $I_1, I_2, \ldots I_n$ in $I_{B1}$ will be turned off. The inductances L1 and L2 are added to the circuit, introducing zero points to increase the circuit bandwidth. The amplifiers A1 and A2 can increase the signal bandwidth and adjust the signal delay time. The internal device parameters of operational amplifiers A1 and A1 are reasonably design so that the delay time of the signal in the feedback loop is τ, T<τ<2T, that is: the signals of the two non-inverting input terminals (Vinp and Vfinp) of the amplifier A0 are in phase, but the arrival time is different by τ.

Wherein T refers to 1 minimum symbol width, for example, if the minimum symbol width of 25 Gbps is 40 ps, then the output amplitude of the long code signal (the width of the long code T1=m×T, m>1) after passing through the amplifier A0 is $$A = \begin{cases} 2I_0R_1 - 2(\overline{K_1}I_1 + \overline{K_2}I_2 + \ldots + \overline{K_n}I_n)R_1 & 0 \le t \le \tau \\ 2I_0R_1 + 2(I_1 + I_2 + \ldots + I_n)R_1 & \tau \le t \le mT \end{cases}$$

and the output amplitude of the short code (the width of the short code=m×T, m=1) is $$A = 2I_0R_1 - 2(\overline{K_1}I_1 + \overline{K_2}I_2 + \ldots + \overline{K_n}I_n)R_1$$

FIG. 2 shows the output waveform of amplifier A0 when $K_1, K_2, \ldots, K_n$ is 0, and its short code output amplitude is 2I0×R1−2(I1+I2+ . . . In)×R1. Because the long code has a larger amplitude than the short code, therefore the rise and fall time of the long code is longer than that of the short code. Similarly, as shown in FIG. 2, compared with the short code, the phase of the long code is delayed. By controlling the on and off states of the switches $K_1, K_2, \ldots, K_n$, the phase difference between the long code and the short code can be adjusted. The form of the phase gap on the signal eye diagram is the jitter of the cross point, the phase difference between the long and short codes is Dj1=0, so this part of the circuit can compensate for the jitter of the eye diagram after the high-speed data passes through the transmission backplane.

Figure 12:
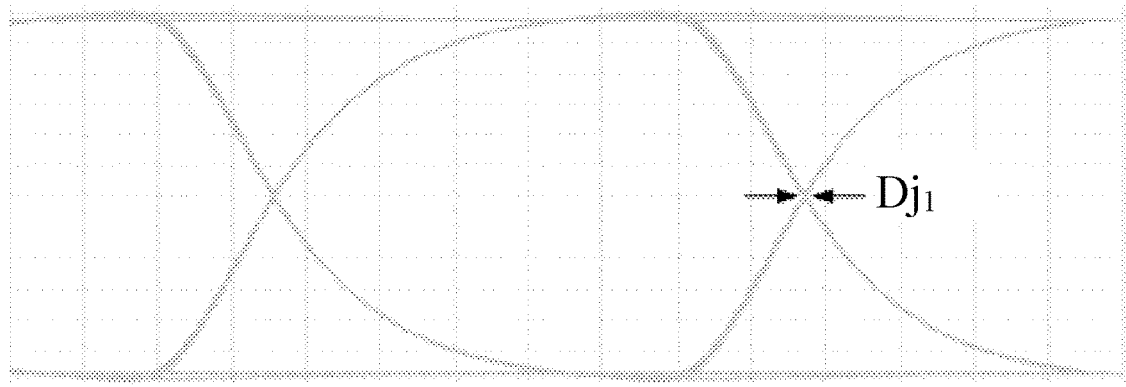
FIG. 12 is a schematic diagram of the simulation results when the long and short code phases are not adjusted.
Figure 13:
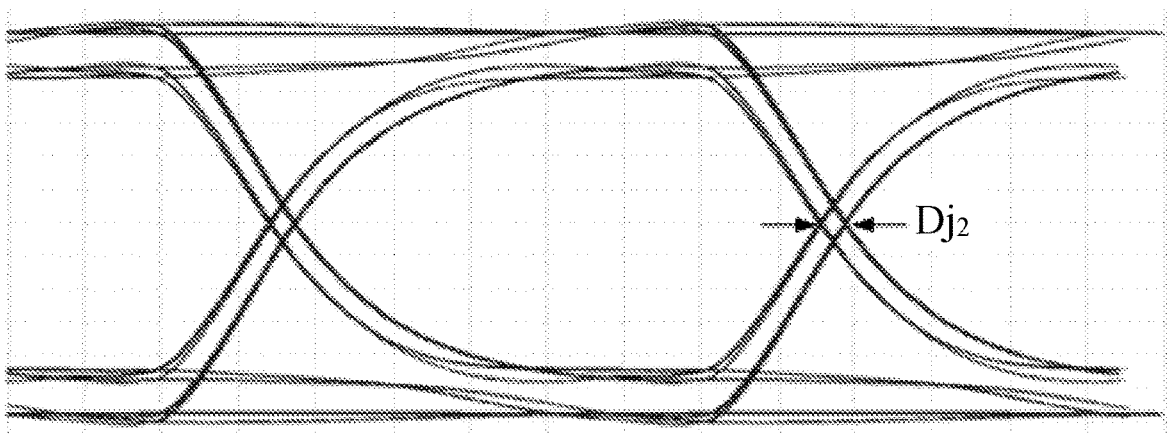
FIG. 13 is a schematic diagram of the simulation results of the long code phase lag adjustment circuit.
Figure 14:
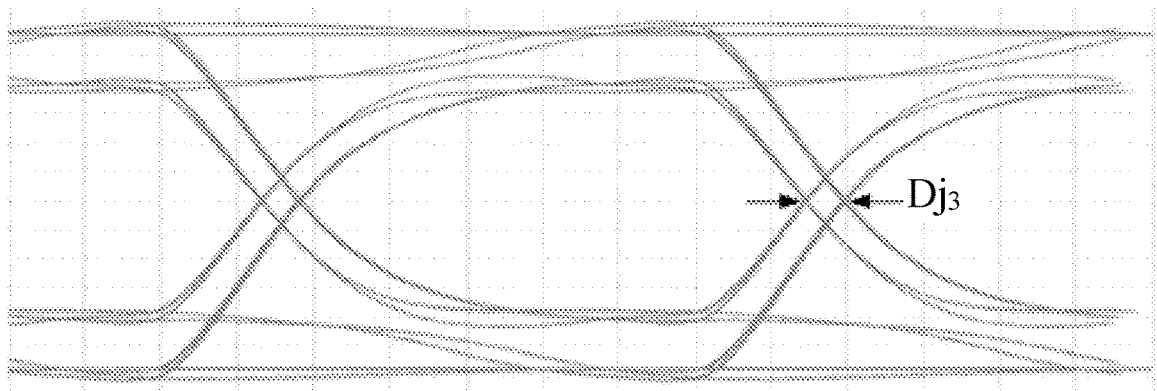
FIG. 14 is a schematic diagram of the simulation result of the long code phase lag adjustment circuit with increased delay time.

FIG. 12, FIG. 13 and FIG. 14 show the simulation results when n=2. When IB=I0+I1+I2, and IB1=0, the simulation result is shown in FIG. 12 in which the amplitude of the long code and the short code are equal. Therefore, at the zero-crossing point, the long code and short code signals will intersect each other, that is, the phase of the long code is not advanced or lagging, but this eye diagram will be greatly degraded after passing through the transmission backplane, making it difficult for the receiving end to recover.

When IB=I0+I2, and IB1=I1, the simulation result is shown in FIG. 13 in which the amplitude of the long code is greater than the amplitude of the short code. Therefore, the phase of the long code is lagging behind the short code; that is, the phase difference between the long code and the short code Dj2≠0.

When IB=I0, and IB1=I1+I2, the simulation result is shown in FIG. 14 in which the phase difference between the long code and the short code further increases, that is: the phase difference between the long code and the short code Dj3>Dj2≠0. The simulation results of FIG. 12, FIG. 13 and FIG. 14 show that adjusting the control switches $K_1, K_2, \ldots, K_n$ of the tail current of the amplifier A0 can realize the adjustment of the phase difference.

FIG. 3 illustrates the working principle of the long code phase lead adjustment circuit shown. Its working principle is similar to the long code phase lag adjustment circuit, the output amplitude of the long code (the width of the long code T1=m×T, m>1) after passing through the amplifier A0 is:

$$A = \begin{cases} 2I_0R_1 + 2(\overline{K_1}I_1 + \overline{K_2}I_2 + \ldots + \overline{K_n}I_n)R_1 & 0 \leq t \leq \tau \\ 2I_0R_1 - 2(I_1 + I_2 + \ldots + I_n)R_1 & \tau \leq t \leq mT \end{cases}$$

The output amplitude of the short code is:

$$A = 2I_0R_1 + 2(\overline{K_1}I_1 + \overline{K_2}I_2 + \ldots + \overline{K_n}I_n)R_1$$

Figure 15:
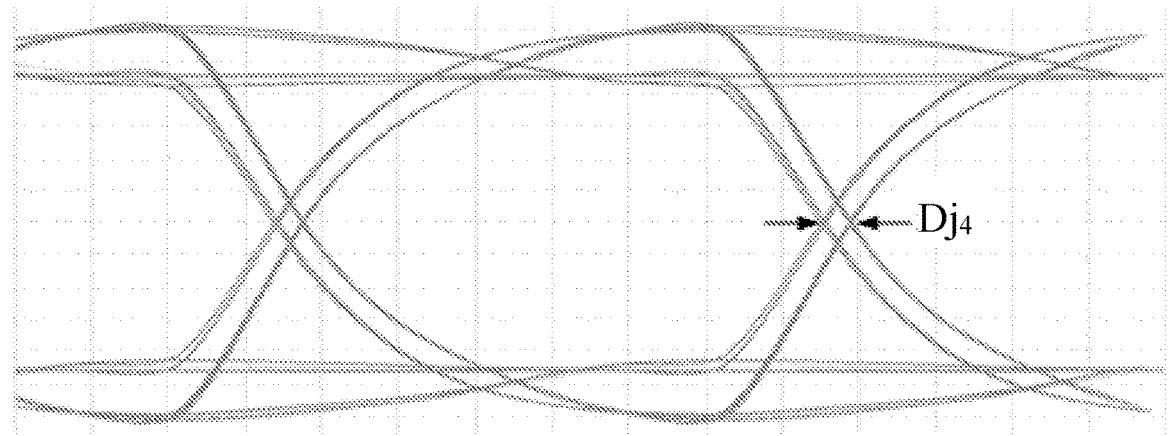
FIG. 15 is a schematic diagram of the simulation result of the long code phase lead adjustment circuit.
Figure 16:
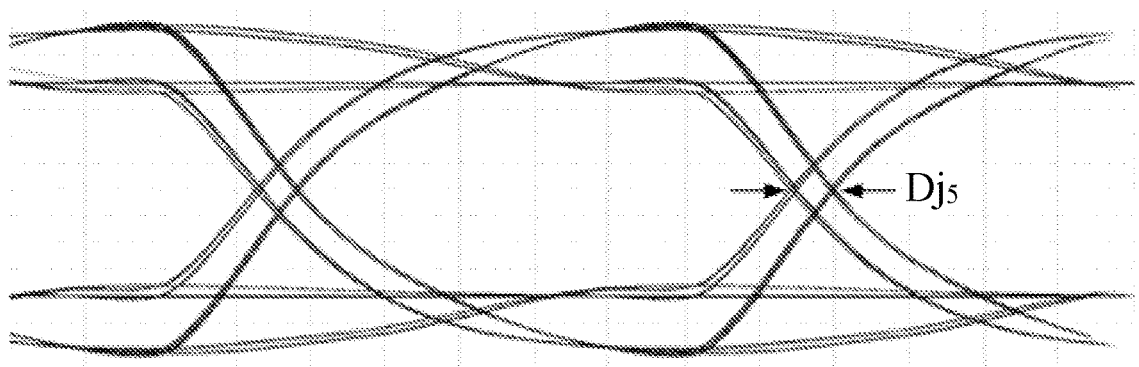
FIG. 16 is a schematic diagram of simulation result of a long code phase lead adjustment circuit with increased delay time.
Figure 17:
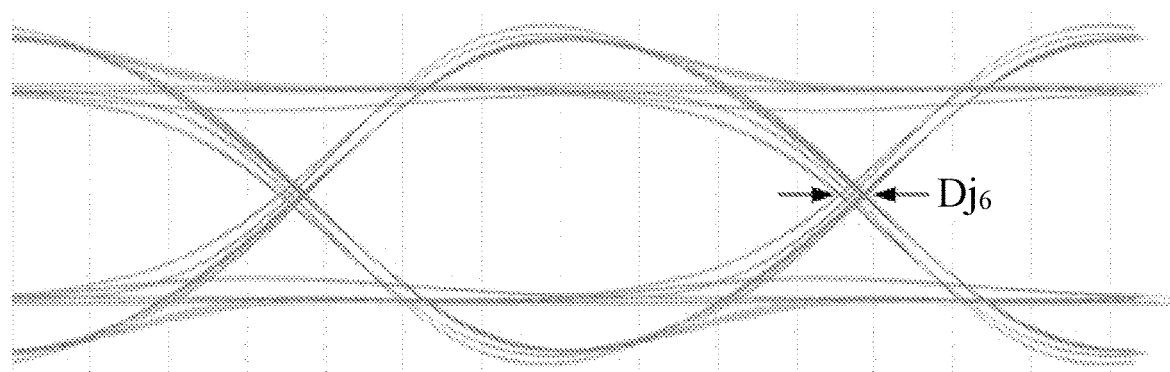
FIG. 17 is a schematic diagram of simulation result of a CML drive circuit for the optical receiving channel using a long code phase lead adjustment circuit without phase adjustment.
Figure 18:
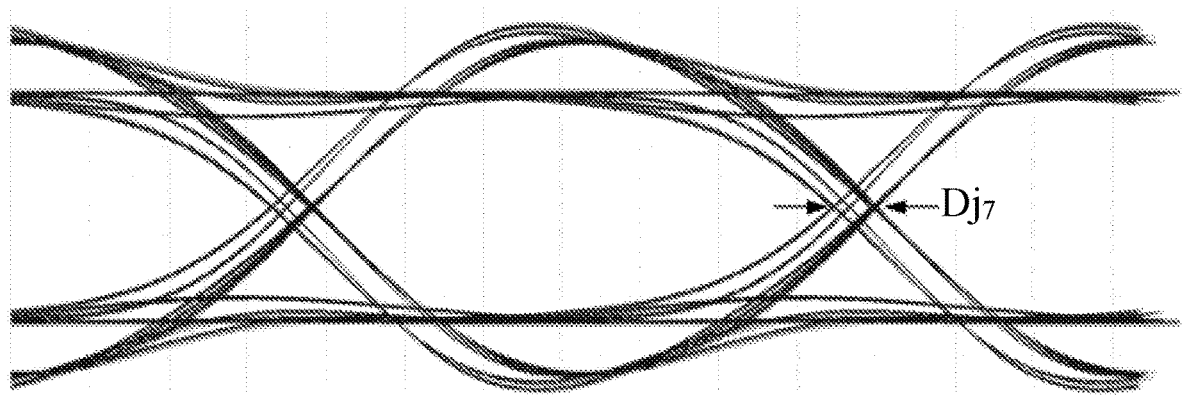
FIG. 18 is a schematic diagram of simulation result of a CML drive circuit for the optical receiving channel using a long code phase lead adjustment circuit with long code phase lead adjustment.
Figure 19:
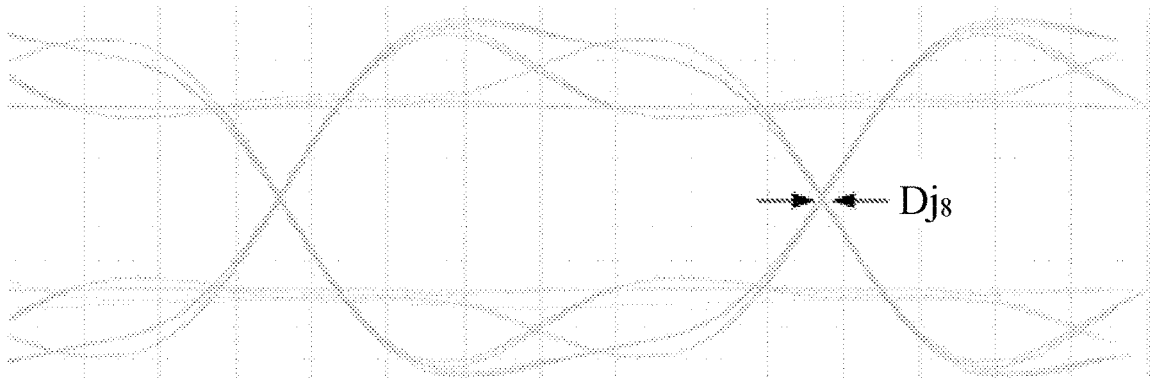
FIG. 19 is a schematic diagram of the simulation results of a high-speed laser drive circuit using a long code phase lag adjustment circuit without phase adjustment.
Figure 20:
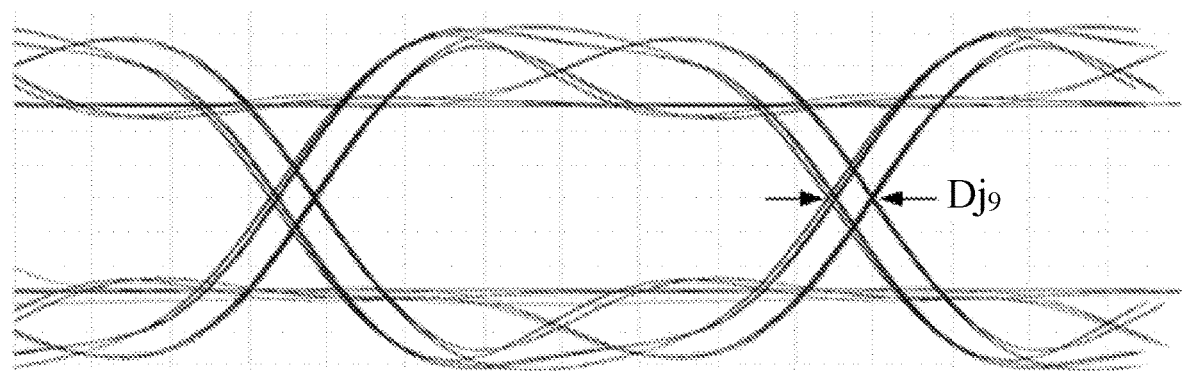
FIG. 20 is a schematic diagram of the simulation results of a high-speed laser drive circuit using a long code phase lag adjustment circuit with long code phase lag adjustment.
Figure 21:
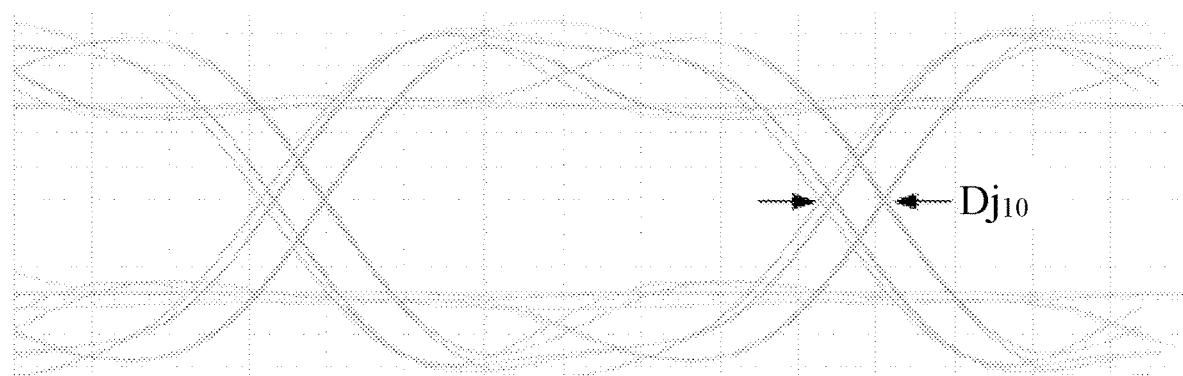
FIG. 21 is a schematic diagram of the simulation results of a high-speed laser drive circuit using a long code phase lag adjustment circuit with long code phase lag adjustment and increased delay time.

FIG. 15 and FIG. 16 show the simulation results when n=2. When IB=I0+I2, and IB1=I1, the simulation result is shown in FIG. 15 in which the amplitude of the long code is smaller than the amplitude of the short code. Therefore, the phase of the long code is advanced relative to the short code, that is, the phase difference between the long code and the short code Dj4≠0. When IB=I0, and IB1=I1+I2, the simulation result is shown in FIG. 16 in which the phase difference between the long code and the short code further increases, that is: the phase difference between the long code and the short code Dj5>Dj4≠0.

Preferred embodiment 2: This embodiment is described with reference to FIGS. 5-11 as follows: This embodiment further explains the Preferred Embodiment 1.

The conventional de-emphasis technology is integrated into the drive circuit formed by a phase delay compensation circuit of the Preferred Embodiment 1 and then the effect is better. The phase delay compensation circuit is divided into two types: the long code phase lag adjustment circuit and the long code phase lead adjustment circuit.

In this preferred embodiment, four examples are given.

Figure 4:
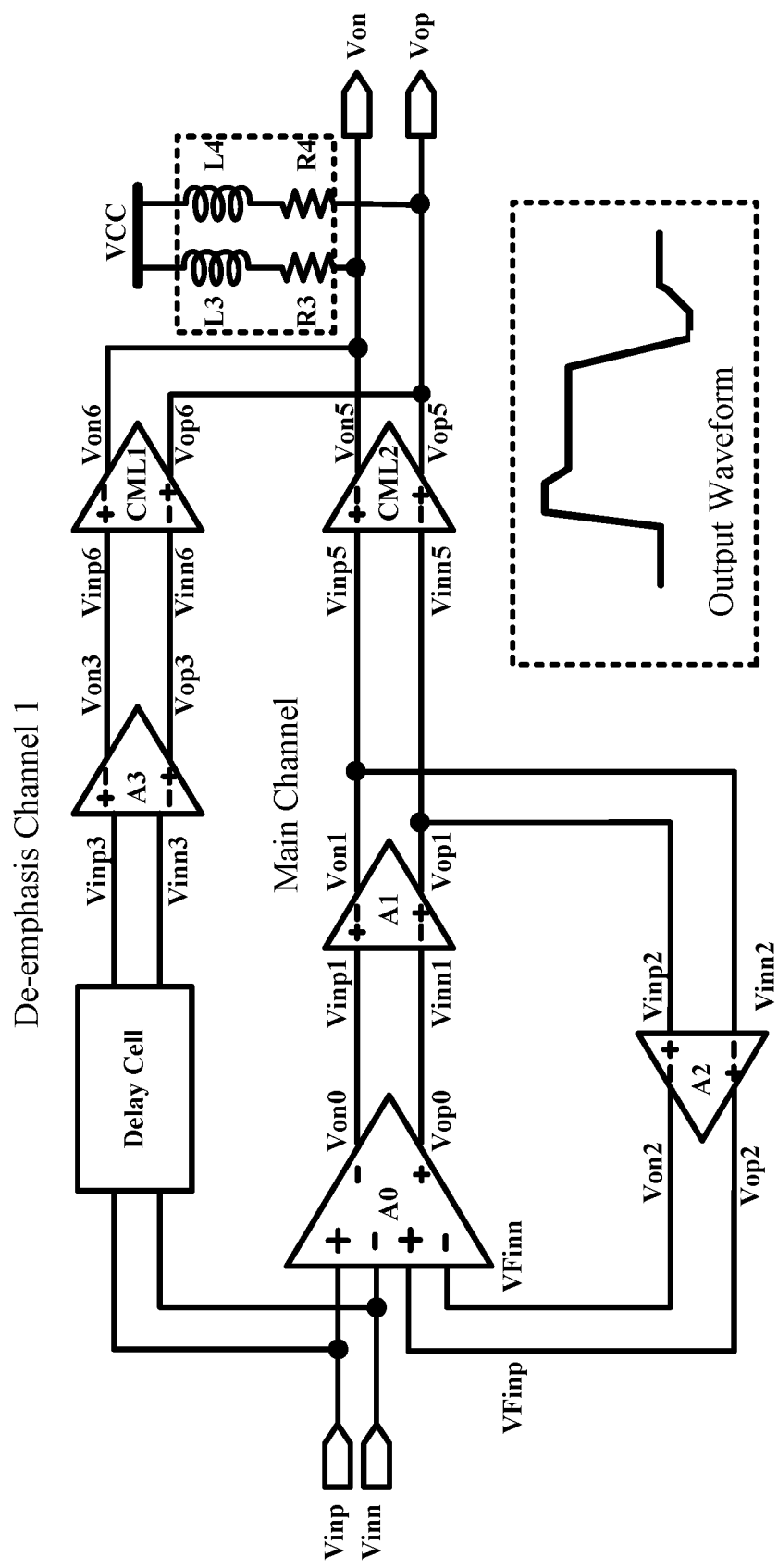
FIG. 4 is a schematic diagram of a CML drive circuit for the optical receiving channel using a long code phase lag adjustment circuit.

Example 1: Referring to FIG. 4, the CML drive circuit of the optical receiving channel using the long code phase lag adjustment circuit is the receiving end drive circuit. The main channel is connected in series by the long code phase lag adjustment circuit and the current mode logic CLM2, and the de-emphasis channel 1 is set in parallel at both ends of the main channel. The de-emphasis channel 1 is composed of a delay unit Delay Cell, an operational amplifier A3, and a current-mode logic CLM1 sequentially connected in series.

The specific structure is: a CML drive circuit for the optical receiving channel using a long code phase lag adjustment circuit comprises: an operational amplifier A0, an operational amplifier A1, an operational amplifier A2, an operational amplifier A3, a current-mode logic CML1, a current-mode logic CML2, a resistor R3, a resistor R4, an inductor L3, an inductor L4 and a Delay Cell (Delay Cell);

a non-inverting input terminal Vinp and an inverting input terminal Vinn of the operational amplifier A0 are used to receive external input electrical signals;

at the same time, the non-inverting input terminal Vinp and the inverting input terminal Vinn of the operational amplifier A0 are connected to input terminals of the Delay Cell;

an output terminal of the Delay Cell is connected to the non-inverting input terminal Vinp3 of the operational amplifier A3;

an output terminal of the Delay Cell is connected to the inverting input terminal Vinn3 of the operational amplifier A3;

the inverting output terminal Von3 of the operational amplifier A3 is connected to the non-inverting input terminal Vinp6 of the current mode logic CML1;

the non-inverting output terminal Vop3 of the operational amplifier A3 is connected to the inverting input terminal Vinn6 of the current-mode logic CML1;

the inverting output terminal Von6 of the current-mode logic CML1 is simultaneously connected to the inverting output terminal Von5 of the current-mode logic CML2, one end of the resistor R3 and the inverting output port Von of the drive circuit;

the non-inverting output terminal Vop6 of the current-mode logic CML1 is simultaneously connected to the non-inverting output terminal Vop5 of the current-mode logic CML2, one end of the resistor R4 and the non-inverting output port Vop of the drive circuit;

the inverting output terminal Von0 of the operational amplifier A0 is connected to the non-inverting input terminal Vinp1 of the operational amplifier A1;

the non-inverting output terminal Vop0 of the operational amplifier A0 is connected to the inverting input terminal Vinn1 of the operational amplifier A1;

the inverting output terminal Von1 of the operational amplifier A1 is simultaneously connected to the non-inverting input terminal Vinp5 of the current-mode logic CML2 and the inverting input terminal Vinn2 of the operational amplifier A2;

the non-inverting output terminal Vop1 of the operational amplifier A1 is simultaneously connected to the inverting input terminal Vinn5 of the current-mode logic CML2 and the non-inverting input terminal Vinp2 of the operational amplifier A2;

the inverting output terminal Von2 of the operational amplifier A2 is connected to the inverting input VFinn of the operational amplifier A0;

the non-inverting output terminal Vop2 of the operational amplifier A2 is connected to the non-inverting input VFinp of the operational amplifier A0;

one end of the inductor L3 is connected to the power supply VCC;

one end of the inductor L4 is connected to the power supply VCC;

the other end of the inductor L3 is connected to the other end of the resistor R3;

the other end of the inductor L4 is connected to the other end of the resistor R4.

Example 2: On the basis of the Example 1, a resonance module is added. The resonance module is set at the output port of the main channel. The resonance module comprises a resistor R3, a resistor R4, an inductor L3, and an inductor L4. One end of the inductor L3 and one end of the inductor L4 are simultaneously connect to the power supply VCC;

the other end of the inductor L3 is connected to one end of the resistor R3; the other end of the resistor R3 is connected to the output port Von of the drive circuit;

the other end of the inductor L4 is connected to one end of the resistor R4; the other end of the resistor R4 is connected to the output port Vop of the drive circuit.

Figure 5:
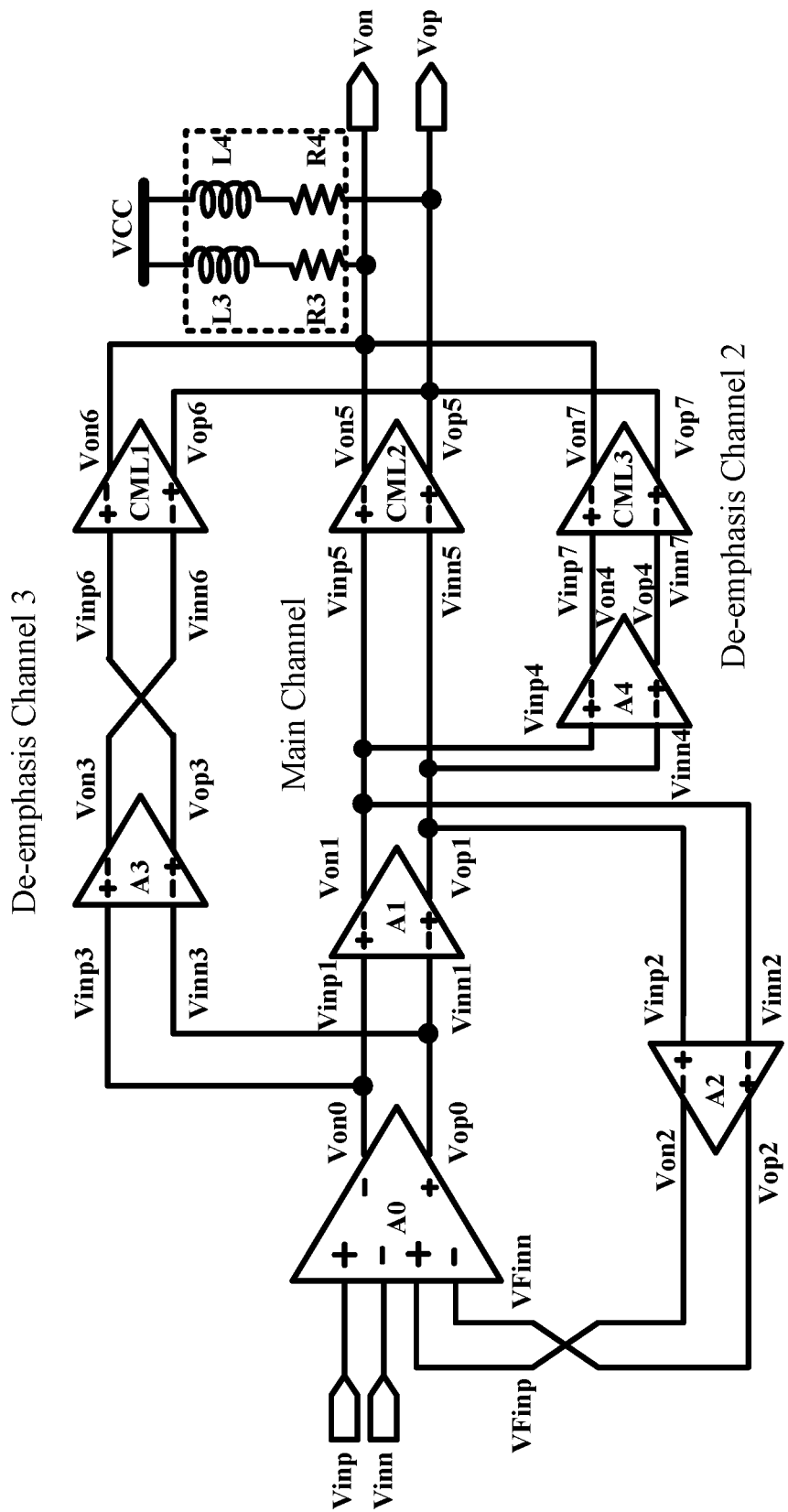
FIG. 5 is a schematic diagram of a laser drive circuit for the optical receiving channel using a long code phase lead adjustment circuit.

Example 3: Referring to FIG. 5 of the drawings, the laser drive circuit of the optical transmitting channel using the long code phase lead adjustment circuit is the transmitting end drive circuit, which comprises de-emphasis channel 3 and de-emphasis channel 2, the main channel further comprises a current mode logic CLM2, the current mode logic CLM2 is connected in series between the long code phase lead adjustment circuit on the main channel and the output port of the drive circuit; the de-emphasis channel 3 is connected in parallel to two ends two ends of the phase lag adjustment circuit at the operational amplifier A1 and the current mode logic CLM2, the de-emphasis channel 2 is connected in parallel at two ends of the current mode logic CLM2.

The specific structure is: the laser drive circuit of the optical transmitting channel using the long code phase lead adjustment circuit comprises an operational amplifier A0, an operational amplifier A1, an operational amplifier A2, an operational amplifier A3, an operational amplifier A4, a current-mode logic CML1, a current-mode logic CML2, a current-mode logic CML3, a resistor R3, a resistor R4, an inductor L3 and an inductor L4.

The non-inverting input terminal Vinp and an inverting input terminal Vinn of the operational amplifier A0 are used to receive external input electrical signals;

the non-inverting output terminal Vop3 of the operational amplifier A3 is connected to the inverting input terminal Vinn6 of the current-mode logic CML1;

the inverting output terminal Von3 of the operational amplifier A3 is connected to the non-inverting input terminal Vinp6 of the current mode logic CML1;

the inverting output terminal Von6 of the current-mode logic CML1 is simultaneously connected to the inverting output terminal Von5 of the current-mode logic CML2, one end of the resistor R3 and the inverting output port Von of the drive circuit;

the non-inverting output terminal Vop6 of the current-mode logic CML1 is simultaneously connected to the non-inverting output terminal Vop5 of the current-mode logic CML2, one end of the resistor R4 and the non-inverting output port Vop of the drive circuit;

the inverting output terminal Von0 of the operational amplifier A0 is simultaneously connected to the non-inverting input terminal Vinp1 of the operational amplifier A1 and the non-inverting input terminal Vinp3 of the operational amplifier A3;

the non-inverting output terminal Vop0 of the operational amplifier A0 is connected to the inverting input terminal Vinn1 of the operational amplifier A1 and the inverting input terminal Vinn3 of the operational amplifier A3;

the inverting output terminal Von1 of the operational amplifier A1 is simultaneously connected to the non-inverting input terminal Vinp5 of the current-mode logic CML2 and the inverting input terminal Vinn2 of the operational amplifier A2;

the non-inverting output terminal Vop1 of the operational amplifier A1 is simultaneously connected to the inverting input terminal Vinn5 of the current-mode logic CML2 and the non-inverting input terminal Vinp2 of the operational amplifier A2;

the inverting output terminal Von2 of the operational amplifier A2 is connected to the non-inverting input VFinp of the operational amplifier A0;

the non-inverting output terminal Vop2 of the operational amplifier A2 is connected to the inverting input VFinn of the operational amplifier A0;

one end of the inductor L3 is connected to the power supply VCC;

one end of the inductor L4 is connected to the power supply VCC;

the other end of the inductor L3 is connected to one end of the resistor R3; the other end of the resistor R3 is connected to the output port Von of the drive circuit;

the other end of the inductor L4 is connected to one end of the resistor R4; the other end of the resistor R4 is connected to the output port Vop of the drive circuit;

the non-inverting input terminal Vinp4 of the operational amplifier A4 is connected to the inverting output terminal Von1 of the operational amplifier A1;

the inverting input terminal Vinn4 of the operational amplifier A4 is connected to the non-inverting output terminal Vop1 of the operational amplifier A1;

the inverting output terminal Von4 of the operational amplifier A4 is connected to the non-inverting input terminal Vinp7 of the current-mode logic CML3;

the non-inverting output terminal Vop4 of the operational amplifier A4 is connected to the inverting input terminal Vinn7 of the current-mode logic CML3;

the inverted output terminal Von7 of the current-mode logic CML3 is connected to the inverting output port Von of the drive circuit;

the non-inverting output terminal Vop7 of the current-mode logic CML3 is connected to the non-inverting output port Vop of the drive circuit.

The structure of the operational amplifiers A3, A4 are the same as that of the operational amplifier A2, and the structure of the current-mode logic CLM1 and CLM3 are the same as that of the current-mode logic CLM2.

Example 4: On the basis of the Example 3, a resonance module is added. The resonance module is set at the output port of the main channel. The resonance module comprises a resistor R3, a resistor R4, an inductor L3, and an inductor L4. One end of the inductor L3 and one end of the inductor L4 are simultaneously connect to the power supply VCC;

the other end of the inductor L3 is connected to one end of the resistor R3; the other end of the resistor R3 is connected to the output port Von of the drive circuit;

the other end of the inductor L4 is connected to one end of the resistor R4; the other end of the resistor R4 is connected to the output port Vop of the drive circuit.

Figure 9:
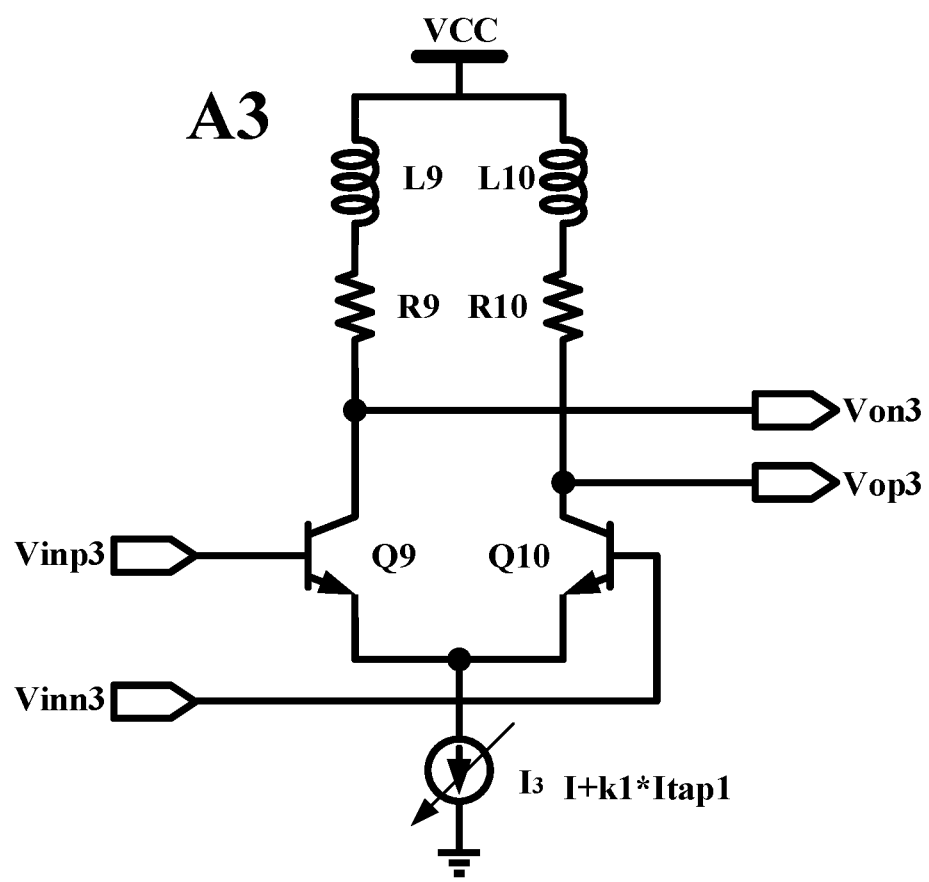
FIG. 9 is a schematic circuit diagram of the amplifier A3.

Referring to FIG. 9 of the drawings, the operational amplifier A3 comprises a bipolar transistor Q9, a bipolar transistor Q10, a resistor R9, a resistor R10, an inductor L9, an inductor L10, and a current source $I_3$;

a base terminal of the bipolar transistor Q9 is connected to the input terminal Vinp3;

a base terminal of the bipolar transistor Q10 is connected to the input terminal Vinn3;

the anode of the current source I3 is simultaneously connected to the emitter terminal of the bipolar transistor Q9 and the emitter terminal of the bipolar transistor Q10;

the cathode of the current source I3 is connected to ground;

the collector terminal of the bipolar transistor Q9 is simultaneously connected to one end of the resistor R9 and the output port Von3;

the collector terminal of the bipolar transistor Q10 is simultaneously connected to one end of the resistor R10 and the output port Vop3;

the other end of the resistor R9 is connected to the inductor L9;

the other end of the resistor R10 is connected to the inductor L10;

the other ends of inductor L9 and L10 are simultaneously connected to power supply VCC.

Figure 10:
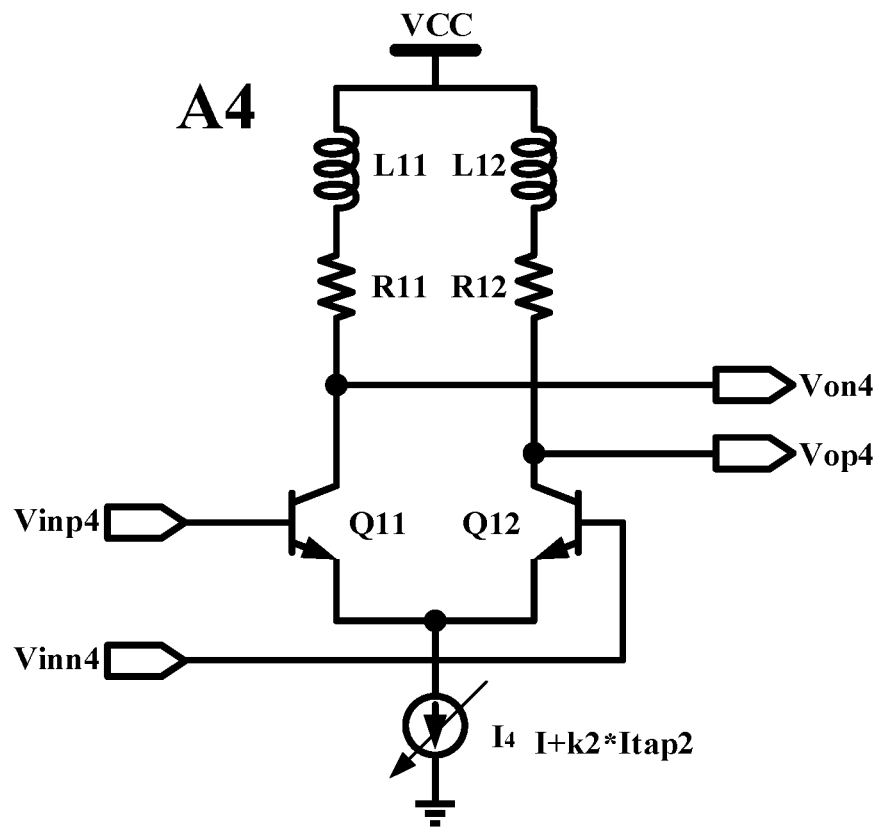
FIG. 10 is a schematic circuit diagram of the amplifier A4.

Referring to FIG. 10 of the drawings, the operational amplifier A4 comprises a bipolar transistor Q11, a bipolar transistor Q12, a resistor R11, a resistor R12, an inductor L11, an inductor L12, and a current source $I_4$;

a base terminal of the bipolar transistor Q11 is connected to the input terminal Vinp4;

a base terminal of the bipolar transistor Q12 is connected to the input terminal Vinn4;

the anode of the current source I4 is simultaneously connected to the emitter terminal of the bipolar transistor Q11 and the emitter terminal of the bipolar transistor Q12;

the cathode of the current source I4 is connected to ground;

the collector terminal of the bipolar transistor Q11 is simultaneously connected to one end of the resistor R11 and the output port Von4;

the collector terminal of the bipolar transistor Q12 is simultaneously connected to one end of the resistor R12 and the output port Vop4;

the other end of the resistor R11 is connected to the inductor L11;

the other end of the resistor R12 is connected to the inductor L12;

the other ends of inductor L11 and L12 are simultaneously connected to power supply VCC.

Figure 11:
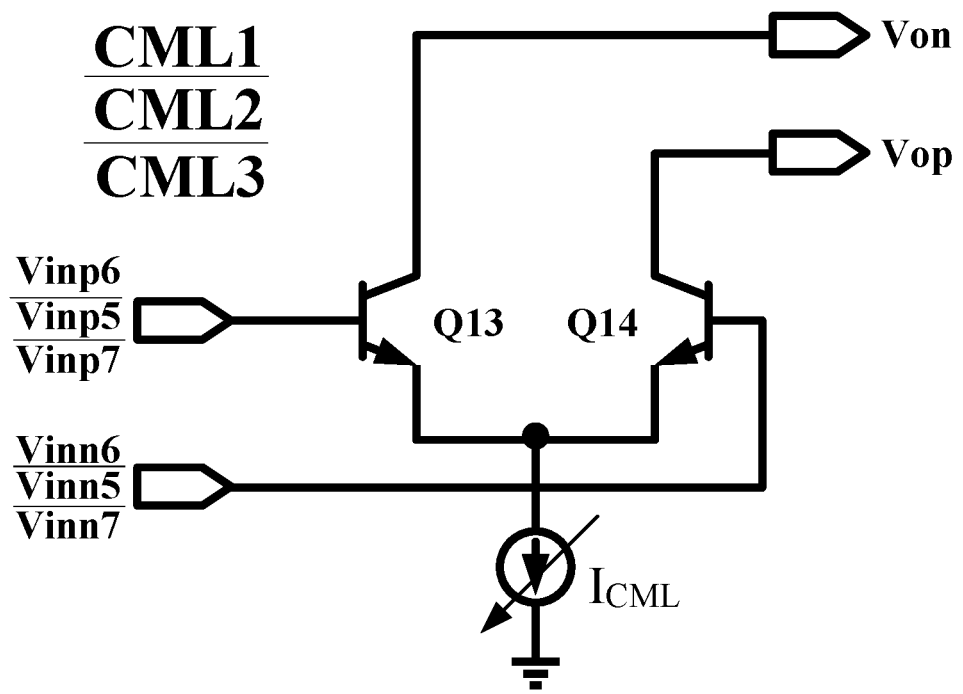
FIG. 11 is a circuit schematic diagram of the current mode logic CML.

Referring to FIG. 11 of the drawings, the current mode logic CLM2 comprises a bipolar transistor Q13, a bipolar transistor Q14 and a current source $I_{CML}$;

a base terminal of the bipolar transistor Q13 is connected to the input terminal Vinp5;

a base terminal of the bipolar transistor Q14 is connected to the input terminal Vinn5;

an anode of the current source ICML is simultaneously connected to an emitter terminal of the bipolar transistor Q13 and an emitter terminal of the bipolar transistor Q14;

a cathode of the current source ICML is connected to ground;

a collector terminal of the bipolar transistor Q13 is connected to the output port Von of the drive circuit;

a collector terminal of the bipolar transistor Q14 is connected to the output port Vop of the drive circuit.

What is claimed is:

1. A high-speed optical transceiver integrated chip drive circuit with phase delay compensation function, which comprises a transmitting/sending end drive circuit and a receiving end drive circuit, the transmitting end drive circuit is used to drive a laser device to emit light for transmitting signals and the receiving end drive circuit is used to optimize a signal degradation caused by the signal transmission by the transmitter end drive circuit to the laser device through a transmission backplane; characterized in that: comprising: a long code phase lead adjustment circuit provided on a main channel of the transmitter end drive circuit; a long code phase lag adjustment circuit provided on a main channel of the receiving end drive circuit;

the long code phase lead adjustment circuit comprises an operational amplifier A0, an operational amplifier A1 and an operational amplifier A2, a non-inverting input terminal Vinp and an inverting input terminal Vinn of the operational amplifier A0 are used to receive external input electrical signals;

an inverting output terminal Von0 of the operational amplifier A0 is connected to a non-inverting input terminal Vinp1 of the operational amplifier A1;

a non-inverting output terminal Vop0 of the operational amplifier A0 is connected to an inverting input terminal Vinn1 of the operational amplifier A1;

an inverting output terminal Von1 of the operational amplifier A1 is simultaneously connected to an output port of the drive circuit Von and an inverting input terminal Vinn2 of the operational amplifier A2;

a non-inverting output terminal Vop1 of the operational amplifier A1 is simultaneously connected to an output port of the drive circuit Vop and a non-inverting input terminal Vinp2 of the operational amplifier A2;

an inverting output terminal Von2 of the operational amplifier A2 is connected to an non-inverting input terminal VFinp of the operational amplifier A0, and a non-inverting output terminal Vop2 of the operational amplifier A2 is connected to an inverting input terminal VFinn of the operational amplifier A0;

the long code phase lag adjustment circuit comprises an operational amplifier A0, an operational amplifier A1 and an operational amplifier A2, a non-inverting input terminal Vinp and an inverting input terminal Vinn of the operational amplifier A0 are used to receive external input electrical signals;

an inverting output terminal Von0 of the operational amplifier A0 is connected to a non-inverting input terminal Vinp1 of the operational amplifier A1;

a non-inverting output terminal Vop0 of the operational amplifier A0 is connected to an inverting input terminal Vinn1 of the operational amplifier A1;

an inverting output terminal Von1 of the operational amplifier A1 is simultaneously connected to an output port of the drive circuit Von and an inverting input terminal Vinn2 of the operational amplifier A2;

a non-inverting output terminal Vop1 of the operational amplifier A1 is simultaneously connected to an output port of the drive circuit Vop and a non-inverting input terminal Vinp2 of the operational amplifier A2;

wherein an inverting output terminal Von2 of the operational amplifier A2 is connected to an inverting input terminal VFinn of the operational amplifier A0 while a non-inverting output terminal Vop2 of the operational amplifier A2 is connected to a non-inverting input terminal VFinp of the operational amplifier A0; or an inverting output terminal Von2 of the operational amplifier A2 is connected to a non-inverting input terminal VFinp of the operational amplifier A0, and a non-inverting output terminal Vop2 of the operational amplifier A2 is connected to an inverting input terminal VFinn of the operational amplifier A0.

2. The high-speed optical transceiver integrated chip drive circuit with phase delay compensation function according to claim 1, characterized in that: the operational amplifier A0 comprises a bipolar transistor Q1, a bipolar transistor Q2, a bipolar transistor Q3, a bipolar transistor Q4, a resistor R1, a resistor R2, an inductor L1, an inductor L2, a current source IB, and a current source IB1;

a base terminal of the bipolar transistor Q1 is connected to the non-inverting input terminal Vinp;

a base terminal of the bipolar transistor Q2 is connected to the inverting input terminal Vinn;

an anode of the current source IB is simultaneously connected to an emitter terminal of the bipolar transistor Q1 and an emitter terminal of the bipolar transistor Q2;
a cathode of the current source IB is connected to ground;
a collector terminal of the bipolar transistor Q1 is simultaneously connected to one end of the resistor R1, a collector terminal of the bipolar transistor Q3 and the output port Von0;
a collector terminal of the bipolar transistor Q2 is simultaneously connected to one end of the resistor R2, a collector terminal of the bipolar transistor Q4 and the output port Vop0;
a base terminal of the bipolar transistor Q3 is connected to the non-inverting input terminal Vfinp;
a base terminal of the bipolar transistor Q4 is connected to the inverting input terminal Vfinn;
an anode of the current source $I_{B1}$ is simultaneously connected to an emitter terminal of the bipolar transistor Q3 and an emitter terminal of the bipolar transistor Q4;
a cathode of the current source $I_{B1}$ is connected to ground;
another end of the resistor R1 is connected to one end of the inductor L1;
another end of the resistor R2 is connected to one end of the inductor L2;
another ends of the inductors L1 and L2 are simultaneously connected to the power supply VCC.

3. The high-speed optical transceiver integrated chip drive circuit with phase delay compensation function according to claim 1, characterized in that: both the current source $I_B$ and the current source $I_{B1}$ are adjustable tail current sources, the current source IB comprises n+1 current branches composed of current sources $I_0$, $I_1$, $I_2$, . . . , $I_n$, wherein the current branches $I_1, I_2, \ldots, I_n$, are on/off controlled by switches $K_1$, $K_2$, . . . , $K_n$ respectively; the current source IB1 comprises n current branches composed of current sources $I_1, I_2, \ldots, I_n$, wherein the current branches $I_1, I_2, \ldots, I_n$, are on/off controlled by switches $\overline{K_1}$, $\overline{K_2}$, . . . , $\overline{K_n}$ respectively; an on/off state of the current source $I_B$ and an on/off state of the current source $I_{B1}$ are complementary and opposite;

an output amplitude of a high-speed signal after being modulated by the operational amplifier A0 of the long code phase lag adjustment circuit is:

$$A = \begin{cases} 2I_0R_1 - 2(\overline{K_1}I_1 + \overline{K_2}I_2 + \ldots + \overline{K_n}I_n)R_1 & 0 \leq t \leq \tau \\ 2I_0R_1 + 2(I_1 + I_2 + \ldots + I_n)R_1 & \tau \leq t \leq mT \end{cases}$$

an output amplitude of a short code signal after being modulated by the operational amplifier A0 of the long code phase lag adjustment circuit is:

$A=2I_0R_1-2(\overline{K_1}I_1+\overline{K_2}I_2+ \ldots +\overline{K_n}I_n)R_1$ where T is 1 minimum symbol width, a long code signal width is mT, m>1; a short code signal width is T;
τ is a delay time of a signal in a feedback loop, that is, a time difference between the signal reaching the non-inverting input terminal Vinp and VFinp of the operational amplifier A0;
an output amplitude of a high-speed signal after being modulated by the operational amplifier A0 of the long code phase lead adjustment circuit is:

$$A = \begin{cases} 2I_0R_1 + 2(\overline{K_1}I_1 + \overline{K_2}I_2 + \ldots + \overline{K_n}I_n)R_1 & 0 \leq t \leq \tau \\ 2I_0R_1 - 2(I_1 + I_2 + \ldots + I_n)R_1 & \tau \leq t \leq mT \end{cases}$$

an output amplitude of a short code signal after being modulated by the operational amplifier A0 of the long code phase lead adjustment circuit is:

$A=2I_0R_1-2(\overline{K_1}I_1+\overline{K_2}I_2+ \ldots +\overline{K_n}I_n)R_1$ 4. The high-speed optical transceiver integrated chip drive circuit with phase delay compensation function according to claim 1, characterized in that: the operational amplifier A1 comprises a bipolar transistor Q5, a bipolar transistor Q6, a resistor R5, a resistor R6, an inductor L5, an inductor L6, a current source I1 and a Delay Cell (Delay Cell);
the input terminals Vinp1 and Vinn1 are connected to input terminals of the Delay Cell;
a base terminal of the bipolar transistor Q5 and a base terminal of the bipolar transistor Q6 are connected to output terminals of the Delay Cell;
an anode of the current source $I_1$ is simultaneously connected to an emitter terminal of the bipolar transistor Q5 and an emitter terminal of the bipolar transistor Q6;
a cathode of the current source $I_1$ is connected to ground;
a collector terminal of the bipolar transistor Q5 is simultaneously connected to one end of the resistor R5 and the inverting output terminal Von1;
a collector terminal of the bipolar transistor Q6 is simultaneously connected to one end of the resistor R6 and the non-inverting output terminal Vop1;
another end of the resistor R5 is connected to one end of the inductor L5;
another end of the resistor R6 is connected to one end of the inductor L6;
another ends of the inductors L5 and L6 are simultaneously connected to the power supply VCC.

5. The high-speed optical transceiver integrated chip drive circuit with phase delay compensation function according to claim 1, characterized in that: the operational amplifier A2 comprises a bipolar transistor Q7, a bipolar transistor Q8, a resistor R7, a resistor R8, an inductor L7, an inductor L8, a current source $I_2$;
a base terminal of the bipolar transistor Q7 is connected to the non-inverting input terminal Vinp2;
a base terminal of the bipolar transistor Q8 is connected to the inverting input terminal Vinn2;
an anode of the current source $I_2$ is simultaneously connected to an emitter terminal of the bipolar transistor Q7 and an emitter terminal of the bipolar transistor Q8;
a cathode of the current source $I_2$ is connected to ground;
a collector terminal of the bipolar transistor Q7 is simultaneously connected to one end of the resistor R7 and the inverting output terminal Von2;
a collector terminal of the bipolar transistor Q8 is simultaneously connected to one end of the resistor R8 and the non-inverting output terminal Vop2;
another end of the resistor R7 is connected to one end of the inductor L7;
another end of the resistor R8 is connected to one end of the inductor L8;
another ends of the inductors L7 and L8 are simultaneously connected to the power supply VCC.

6. The high-speed optical transceiver integrated chip drive circuit with phase delay compensation function according to claim 1, characterized in that:
the receiving end drive circuit further comprises a de-emphasis channel 1,
the main channel further comprises a current mode logic CLM2, the current mode logic CLM2 is connected in series between the long code phase lead adjustment circuit on the main channel and the output port of the drive circuit;

the de-emphasis channel 1 is connected in parallel to two ends of the main channel, or two ends of the phase lag adjustment circuit at the operational amplifier A1 and the current mode logic CLM2.

7. The high-speed optical transceiver integrated chip drive circuit with phase delay compensation function according to claim 6, characterized in that:
the transmitting end drive circuit further comprises de-emphasis channel 3 and de-emphasis channel 2,
the main channel further comprises a current mode logic CLM2,
the current mode logic CLM2 is connected in series between the long code phase lead adjustment circuit on the main channel and the output port of the drive circuit;
the de-emphasis channel 3 is connected in parallel to two ends two ends of the phase lag adjustment circuit at the operational amplifier A1 and the current mode logic CLM2,
the de-emphasis channel 2 is connected in parallel at two ends of the current mode logic CLM2.

8. The high-speed optical transceiver integrated chip drive circuit with phase delay compensation function according to claim 7, characterized in that:
the receiving end drive circuit or the transmitting end drive circuit further comprises a resonance module, and the resonance module is provided at an output port of the main channel,
the resonance module comprises a resistor R3, a resistor R4, an inductor L3, and an inductor L4,
one end of the inductor L3 and one end of the inductor L4 are simultaneously connected to the power supply VCC;
another end of the inductor L3 is connected to one end of the resistor R3; another end of the resistor R3 is connected to the output terminal Von of the drive circuit;
another end of the inductor L4 is connected to one end of the resistor R4; another end of the resistor R4 is connected to the output terminal Vop of the drive circuit.

9. The high-speed optical transceiver integrated chip drive circuit with phase delay compensation function according to claim 6, characterized in that:
the de-emphasis channel 1 is composed of the Delay Cell, the operational amplifier A3 and the current mode logic CLM1 connected in series;
the de-emphasis channel 3 is composed of sequentially connected the operational amplifier A3 and the current mode logic CLM1 in series;
the de-emphasis channel 2 is composed of the operational amplifier A4 and the current mode logic CLM3 connected in series;
a structure of the operational amplifier A3, A4 is identical to a structure of the operational amplifier A2,
a structure of the current mode logic CLM1 and CLM3 is identical to a structure of the current mode logic CLM2.

10. The high-speed optical transceiver integrated chip drive circuit with phase delay compensation function according to claim 9, characterized in that:
the current mode logic CLM2 comprises a bipolar transistor Q13, a bipolar transistor Q14 and a current source $I_{CML}$;
a base terminal of the bipolar transistor Q13 is connected to the input terminal Vinp5;
a base terminal of the bipolar transistor Q14 is connected to the input terminal Vinn5;
an anode of the current source $I_{CML}$ is simultaneously connected to an emitter terminal of the bipolar transistor Q13 and an emitter terminal of the bipolar transistor Q14;
a cathode of the current source $I_{CML}$ is connected to ground;
a collector terminal of the bipolar transistor Q13 is connected to the output port Von of the drive circuit;
a collector terminal of the bipolar transistor Q14 is connected to the output port Vop of the drive circuit.

11. The high-speed optical transceiver integrated chip drive circuit with phase delay compensation function according to claim 9, characterized in that:
the receiving end drive circuit or the transmitting end drive circuit further comprises a resonance module, and the resonance module is provided at an output port of the main channel,
the resonance module comprises a resistor R3, a resistor R4, an inductor L3, and an inductor L4,
one end of the inductor L3 and one end of the inductor L4 are simultaneously connected to the power supply VCC;
another end of the inductor L3 is connected to one end of the resistor R3; another end of the resistor R3 is connected to the output terminal Von of the drive circuit;
another end of the inductor L4 is connected to one end of the resistor R4; another end of the resistor R4 is connected to the output terminal Vop of the drive circuit.

12. The high-speed optical transceiver integrated chip drive circuit with phase delay compensation function according to claim 6, characterized in that:
the receiving end drive circuit or the transmitting end drive circuit further comprises a resonance module, and the resonance module is provided at an output port of the main channel,
the resonance module comprises a resistor R3, a resistor R4, an inductor L3, and an inductor L4,
one end of the inductor L3 and one end of the inductor L4 are simultaneously connected to the power supply VCC;
another end of the inductor L3 is connected to one end of the resistor R3; another end of the resistor R3 is connected to the output terminal Von of the drive circuit;
another end of the inductor L4 is connected to one end of the resistor R4; another end of the resistor R4 is connected to the output terminal Vop of the drive circuit.

\* \* \* \* \*